United States Patent [19]

Phillips

[11] 4,230,771
[45] Oct. 28, 1980

[54] POLYVINYL BUTYRAL LAMINATES WITH TETRAETHYLENEGLYCOL DI-N-HEPTANOATE PLASTICIZER

[75] Inventor: Thomas R. Phillips, Belpre, Ohio

[73] Assignee: E. I. Du Pont de Nemours and Company, Wilmington, Del.

[21] Appl. No.: 71,535

[22] Filed: Aug. 31, 1979

[51] Int. Cl.² .................. C08F 45/38; B32B 17/10; B32B 27/42
[52] U.S. Cl. ................ 428/437; 260/31.8 R; 525/61; 526/315
[58] Field of Search .................. 428/437, 426; 260/31.8 R; 525/61; 526/315

[56] References Cited

U.S. PATENT DOCUMENTS

| | | | |
|---|---|---|---|
| 2,045,130 | 6/1936 | Fix | 428/437 |
| 2,202,160 | 5/1940 | Marks | 428/437 |
| 2,274,672 | 3/1942 | Dennison | 428/437 |
| 2,412,469 | 12/1946 | Nicholl | 260/488 |
| 3,178,334 | 4/1965 | Bragaw | 428/437 |
| 3,296,211 | 1/1967 | Winkler | 260/31.8 R |
| 3,361,565 | 1/1968 | Umberger | 430/503 |
| 3,384,532 | 5/1968 | Martins | 428/437 |
| 3,525,703 | 8/1970 | Iwami | |
| 3,578,621 | 5/1971 | Stapfer | 260/31.8 R |
| 3,841,955 | 10/1974 | Croaker | 428/437 |
| 4,055,430 | 10/1977 | Hasegawa | |

Primary Examiner—Ellis P. Robinson

[57] ABSTRACT

Laminates of glass and polyvinyl butyral plasticized with tetraethyleneglycol di-n-heptanoate.

7 Claims, 1 Drawing Figure

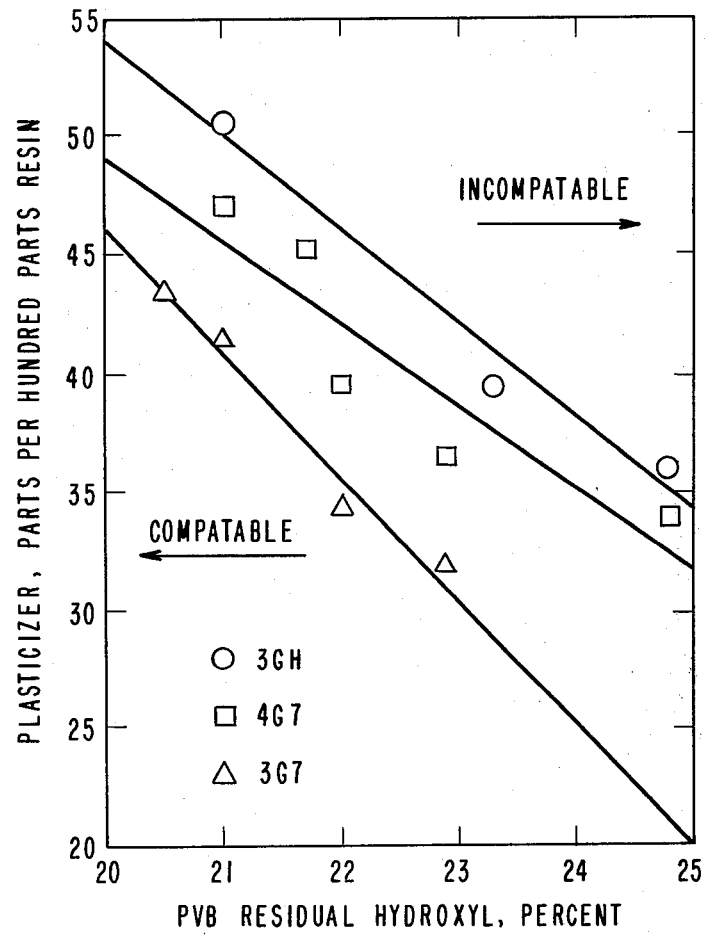

POLYVINYL BUTYRAL LAMINATES WITH TETRAETHYLENEGLYCOL DI-N-HEPTANOATE PLASTICIZER

BACKGROUND OF THE INVENTION

Polyvinyl butyral is widely used in combination with one or more layers of glass to provide a composition which is resistant to shattering. The polyvinyl butyral typically contains a plasticizer to provide a balance of mechanical properties satisfactory for subsequent handling and performance requirements. It has been found that while certain plasticizers perform satisfactorily in combination with polyvinyl butyral, high concentrations of the plasticizer are generally necessary for satisfactory handling characteristics. In addition, many known plasticizers are incompatible with polyvinyl butyral outside of limited ranges of hydroxyl content.

SUMMARY OF THE INVENTION

The instant invention provides laminates of at least one layer of glass and a plastic layer adhering to the glass, wherein the plastic layer is polyvinyl butyral plasticizer with tetraethyleneglycol di-n-heptanoate of the formula:

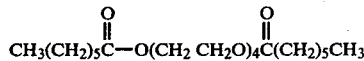

BRIEF DESCRIPTION OF THE FIGURE

The FIGURE is a graphical representation of the compatibility of the compositions used in the present invention with polyvinyl butyral as compared with known plasticizers.

DETAILED DESCRIPTION OF THE INVENTION

The present invention is based on the discovery of a new composition, tetraethyleneglycol di-n-heptanoate, and its particular suitability as a plasticizer in polyvinyl butyral laminates. The composition has the following formula:

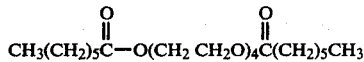

This composition can be prepared by bringing into contact tetraethyleneglycol and heptanoic acid. These compounds are believed to react according to the equation:

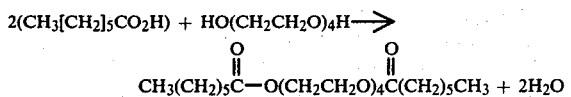

While the desired product will generally be obtained in all proportions of the reactants, for maximum purity of the desired tetraethyleneglycol di-n-heptanoate at least two moles of heptanoic acid should be present for each mole of tetraethyleneglycol. Higher concentrations of the heptanoic acid, for example, up to about 2.5 moles of heptanoic acid for each mole of tetraethyleneglycol, are preferred when no additional catalyst or solvent is used in the reaction.

The reaction of heptanoic acid and tetraethyleneglycol can be carried out without a catalyst. However, the rate and ease of reaction are facilitated by the presence of a catalyst. The catalyst can, and the most basic situation, be a minor excess of the heptanoic acid itself. Other catalysts which can be used include a variety of acids, including sulfuric, formic, polyphosphoric, or p-toluenesulfonic acid and combinations of such acids. The catalyst, when used, is generally present in an amount to equal to about from 0.01 to 5.0 weight percent of the total reactants.

A solvent in addition to the reactants can be used in the preparation of the tetraethyleneglycol di-n-heptanoate if desired. The solvent should be inert to the reactants and should preferably form an azeotrope with the water that is formed in the course of the reaction. Particularly satisfactory and convenient are organic solvents such as toluene, xylene, and benzene.

The preparation of the compound used in the present invention can be carried out at ambient temperatures and pressures. However, to facilitate the reaction and for ease of removal of the water formed in the reaction, the synthesis is preferably carried out at elevated temperatures of about from 50° to 300° C. Particularly satisfactory is a temperature equivalent to the boiling point of an azeotrope of water with either the heptanoic acid or solvent used in the reaction.

The water formed by the reaction of the two components is preferably removed during the course of the reaction to both increase the rate of reaction, drive the reaction to completion and to monitor its progress by measurement of the quantity of water generated. The water is conveniently removed by distillation of the azeotrope of water and acid or solvent.

After completion of the reaction, the tetraethyleneglycol di-n-heptanoate can be recovered as a viscous colorless oil. If desired, residual solvent, water, catalyst or other impurities can be removed by conventional purification techniques, including filtration through anhydrous magnesium sulfate or charcoal or by vacuum distillation. The product as prepared frequently contains minor quantities, for example, up to 10 weight percent of various unreacted glycols such as ethylene, diethylene, triethylene and tetraethylene glycols, unreacted heptanoic and alpha-methylhexanoic acids as well as the mono- and di- esters thereof.

The tetraethyleneglycol di-n-heptanoate (4G7) can be incorporated into polyvinyl butyral as a plasticizer using techniques that are usually used for other plasticizers. The polyvinyl butyral and diesters of this acid as well as plasticizer are present in quantities which result in a compatible admixture. The quantities of plasticizer which can be added to any polyvinyl butyral vary according to the residual hydoxyl content of the polyvinyl butyral as illustrated in the Figure. Thus, in polyvinyl butyral having a residual hydroxyl content of 20 percent, as much as 49 parts by weight of 4G7 plasticizer can be added per each hundred parts of polyvinyl butyral. However, for polyvinyl butyral resins having 25 weight percent residual hydroxyl content, a maximum of only about 32 parts of 4G7 plasticizer can be added per hundred parts of polyvinyl butyral resin. At or below these maximum quantities or at intermediate points along the line indicating maximum compatible plasticizer level, the quantity of plasticizer can be adjusted to achieve the desired level of polymer sheet characteristics.

The plasticized polyvinyl butyral sheeting can be laminated to one or more layers of glass according to the procedures generally used in the art and illustrated, for example, in U.S. Pat. Nos. 2,293,656, 3,838,091, and 4,107,366.

The composition used in the instant invention provides outstanding plasticization of polyvinyl butyral and excellent performance in the glass laminates. It has been found that the composition is compatible with polyvinyl butyral over a wide range of hydroxyl contents, and provides sheeting with excellent dimensional stability, tensile strength and stiffness at plasticizer concentrations which are lower then those required, for example, using triethyleneglycol di-2-ethylbutyrate (3GH). In addition, if desired, these compositions can be used in conjunction with triethyleneglycol di-2-ethylbutyrate. Although any proportion of the two plasticizers can be used, the beneficial effects of the instant compositions are most apparent in such mixtures when the tetraethyleneglycol di-n-heptanoate represents at least 10 weight percent of the blend of the two plasticizers.

The present invention is further illustrated in the following specific examples, in which parts and percentages are by weight unless otherwise indicated. In these examples, the following procedures and tests were used.

PVB Residual Hydroxyl (Weight Percent as PVA): ASTM D1396.

Pummel Adhesion: SAE J1208

Penetration Resistance: ANSI Z26.1 using a staircase method to determine mean break height instead of the one level test of Z26.1 as described in U.S. Pat. 3,718,516.

Edge Stability: ANSI Z26.1 with samples tested for four weeks instead of two.

Accelerated Edge Cloud/Edge Stability: Test laminates were prepared by placing 30-mil film between two pieces of 12×12×0.1-inch (30.5×30.5×0.25 cm) glass, and treating with the following heat and pressure cycle: (1) 1 minute at 200° C. then press between nip rolls, (2) 3 minutes at 200° C. then press again between nip rolls, and (3) 9 minutes at 135° C. and 225 psig (1.55MPa, gage) in an oil autoclave. The laminate is immersed in commercial, ammoniacal alcohol glass cleaning solution at 60° C. for 30 days. The laminate is then removed from the solution and the resulting edge cloud is measured immediately. After standing at ambient conditions for an additional 30 days, the laminate is reexamined for edge delaminations.

Plasticizer Content by Vacuum Distillation: Molded or extruded sheeting samples are dried in an oven at 60° C. for 30-60 minutes and weighed into a test tube. An accurately tared receiver is then attached. The tube is placed in a 285 ±2° C. heating block and vacuum (13 Pa minimum) is applied. After 45 minutes, the receiver containing evolved plasticizer is disconnected and weighed. The parts of plasticizer per hundred parts resin is calculated by multiplying the weight of collected plasticizer by 100 and dividing by the difference between the original sample weight minus the weight plasticizer.

EXAMPLE 1 & COMPARATIVE EXAMPLES A & B

Tetraethyleneglycol di-n-heptanoate (4G7) was blended with polyvinyl butyral and the resulting blend formed into sheeting. The plasticized polyvinyl butyral sheeting was laminated between two layers of glass as described above in the accelerated Edge Cloud/Edge Stability test. The resulting samples were tested and the results summarized in the following Table.

In Comparative Examples A & B, the above laminating and testing procedures were repeated, using commercially available polyvinyl butyral sheeting plasticized with triethyleneglycol di-2-ethylbutyrate (3GH) and triethyleneglycol di-n-heptanoate (3G7).

TABLE

| | Examples | | |
|---|---|---|---|
| Property | 1<br>4G7 | A<br>3GH | B<br>3G7 |
| PVB Residual Hydroxyl, % | 23.0 | 23.2 | 20.8 |
| Plasticizer, phr | 35.2 | 44.0 | 38.0 |
| Alkalinity Titer, cc | 167.1 | 130.0 | 192.0 |
| Interlayer Thickness, mils (mm) | 31.4<br>(0.80) | 30.4<br>(0.77) | 29.8<br>(0.76) |
| Moisture, % | 0.55 | 0.42 | 0.43 |
| Penetration Resistance (Mean Break Height), Ft (m) | 20.0<br>(6.10) | 17.3<br>(5.27) | 18.3<br>(5.58) |
| Pummel Adhesion | 3 | 2 | 2 |
| Humidity Test (4-week) | | | |
| Edge Cloud, 64th in (mm) | 11<br>(4.4) | 24<br>(9.5) | 20<br>(7.9) |
| Edge Stability, let-goes | 0 | 0 | 0 |
| Accelerated "Windex" Test-4 week | | | |
| Edge Cloud, 64th in (mm) | 30.5<br>(12.1) | 46<br>(18.3) | — |

The laminates of the present invention, using polyvinyl butyral plasticized with 4G7, exhibit superior mechanical properties as well as edge cloud resistance.

I claim:
1. A laminar structure comprising at least one layer of glass and a layer of a plastic composition comprising polyvinyl butyral and, in compatible admixture therewith, a plasticizer comprising at least about 10 weight percent tetraethyleneglycol di-n-heptanoate of the formula:

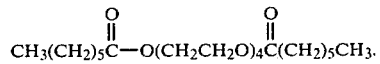

2. A laminar structure of claim 1 wherein the polyvinyl butyral has a hydroxyl content of about from 15 to 30 percent calculated as polyvinyl alcohol.

3. A laminar structure of claim 2 wherein the polyvinyl butyral has a hydroxyl content of about from 20 to 25 weight percent, calculated as polyvinyl alcohol.

4. A laminar structure of claim 1 wherein the plasticizer consists essentially of tetraethyleneglycol di-n-heptanoate in a quantity of about from 20 to 55 parts per hundred of polyvinyl butyral.

5. A laminar structure of claim 4 wherein the tetraethyleneglycol di-n-heptanoate is present in a quantity of about 30 to 45 parts per hundred of polyvinyl butyral.

6. A laminar structure of claim 1 wherein the plasticizer comprises a mixture of tetraethyleneglycol di-n-heptanoate and triethyleneglycol di-2-ethylbutyrate.

7. A laminar structure of claim 1 comprising two layers of glass and one layer of the plastic composition.

* * * * *